(12) United States Patent
Duprey

(10) Patent No.: US 7,255,563 B2
(45) Date of Patent: Aug. 14, 2007

(54) EDUCATIONAL TOY

(76) Inventor: John F. Duprey, 807 Sixth St., Watervliet, NY (US) 12189

( * ) Notice: Subject to any disclaimer, the term of this patent is extended or adjusted under 35 U.S.C. 154(b) by 243 days.

(21) Appl. No.: 11/060,800

(22) Filed: Feb. 18, 2005

(65) Prior Publication Data

US 2006/0188851 A1   Aug. 24, 2006

Related U.S. Application Data

(63) Continuation-in-part of application No. 11/035,738, filed on Jan. 18, 2005, now abandoned, which is a continuation of application No. 10/873,137, filed on Jun. 23, 2004, now Pat. No. 6,843,655.

(51) Int. Cl.
G09B 27/08 (2006.01)
(52) U.S. Cl. ...................... 434/131; 446/268
(58) Field of Classification Search ................ 434/130, 434/133, 134, 136, 148; 446/268, 369, 370, 446/373, 71–72, 76–77; D10/10; D11/152, D11/157; D19/61
See application file for complete search history.

(56) References Cited

U.S. PATENT DOCUMENTS

| D67,422 S | 5/1925 | Thompson |
|---|---|---|
| D218,333 S | 8/1970 | Cummings |
| 3,895,457 A | 7/1975 | Koskiewicz |
| D265,492 S | 7/1982 | Johanson |
| D297,749 S | 9/1988 | Rodis-Jamero |
| 4,936,779 A * | 6/1990 | Carlson ...................... 434/143 |
| 5,090,935 A | 2/1992 | Monson |
| 5,090,938 A | 2/1992 | Reynolds |
| D367,686 S | 3/1996 | Decanay |
| D409,662 S * | 5/1999 | Ho ............................. D19/61 |
| 6,106,360 A | 8/2000 | Jenkins et al. |
| 6,176,705 B1 | 1/2001 | Garvey et al. |
| 6,659,840 B2 | 12/2003 | Chastain et al. |
| 2002/0045400 A1 | 4/2002 | Chastain et al. |
| 2002/0102909 A1 | 8/2002 | Derraugh et al. |

FOREIGN PATENT DOCUMENTS

| GB | 2 235 805 A | 3/1991 |
|---|---|---|
| JP | 7-631 | 1/1995 |

* cited by examiner

*Primary Examiner*—Kurt Fernstrom
(74) *Attorney, Agent, or Firm*—Richard C. Litman

(57) ABSTRACT

The educational toy includes a toy figure having a body, a frame affixed within a portion of the body, and an earth globe disposed within the frame. The globe is configured to rotate within the frame. The globe is configured to represent the earth, and has outlines representing the continents and at least larger countries or geographical regions, and may have contours representing mountains or other features. The globe may alternatively be retained on an outstretched hand or limb of a figure and may be rotated on a shaft attached to the limb or limbs of the figure. Optionally, the educational toy may be illuminated, play back an educational audio message, or include a motor for rotating the globe.

3 Claims, 6 Drawing Sheets

EDUCATIONAL TOY

CROSS-REFERENCE TO RELATED APPLICATION

This is a continuation-in part of my prior application Ser. No. 11/035,738, filed Jan. 18, 2005 now abandoned and titled "Educational Toy," which is a continuation of my prior application Ser. No. 10/873,137, filed Jun. 23, 2004 and now issued as U.S. Pat. No. 6,843,655 B1.

BACKGROUND OF THE INVENTION

1. Field of the Invention

The present invention relates to an educational toy and, more particularly, to a toy figurine which has a revolving globe disposed therein.

2. Description of the Related Art

Knowledge of geography is essential for appreciating the physical and social aspects of the complex global world in which we live. Traditional teaching devices for facilitating comprehension of world geography are rarely useful for most children. A conventional world globe, for example, is a teaching device which is frequently used to educate children on world geography. In the classroom, however, few children feel comfortable familiarizing themselves with a heavy globe which may rest on a teacher's desk or bookshelf. Outside of the classroom, most children would prefer to amuse themselves with toys rather than a traditional learning device, such as a globe of the earth. Thus, an educational toy incorporating a globe to teach world geography and the earth's rotation about an axis is desirable.

Educational toys associated with geographical or multicultural concepts are described or disclosed in U.S. Design Pat. No. 67,422, issued May 26, 1925 to V. C. Thompson (a doll); U.S. Design Pat. No. 367,686, issued Mar. 5, 1996 to Lolita B. Decanay (a doll); U.S. Patent Publication No. 2002/0045400, published Apr. 18, 2002 (set of dolls for simulating a universal beauty pageant); U.S. Patent Publication No. 2002/0102909, published Aug. 1, 2002 to Derraugh et al. (cloth shape with pockets for objects; U.S. Pat. No. 3,895,457, issued Jul. 22, 1975 to E. Koskiewicz (global sphere yo-yo device); U.S. Pat. No. 5,090,935, issued Feb. 25, 1992 to C. S. Monson (composite toy having interconnectable toy components); U.S. Pat. No. 5,090,938, issued Feb. 25, 1992 to C. Reynolds (toy or other object alterable between two different shapes); U.S. Pat. No. 6,659,840, issued Dec. 9, 2003 to Chastain et al. (set of dolls for simulating a universal beauty pageant); U.K. Patent No. 2,235,805, published Mar. 13, 1991 (educational globe toy); and Japanese Patent No. 7-631, published Jan. 6, 1995 (toy for intellectual training).

None of the above inventions and patents, taken either singly or in combination, is seen to describe the instant invention as claimed. Thus, an educational toy solving the aforementioned problems is desired.

SUMMARY OF THE INVENTION

The educational toy includes a toy figure having a body, a frame affixed within a portion of the body, and an earth globe disposed within the frame. The globe is configured to rotate within the frame. The toy figure may be a doll, a figurine, a teddy bear or other stuffed animal, an inflatable water toy, a hand or string puppet, an angel, a Santa Claus or any other toy figure depicting a human, animal, alien, fantasy, or other character having a body capable of mounting a revolving globe therein. The globe is configured to represent the earth, and has outlines representing the continents and at least larger countries or geographical regions, and may have contours representing mountains or other features.

The three-dimensional globe may alternatively be retained on an outstretched hand or limb of a figure and may be rotated on a shaft or ball bearings attached to the limb or limbs of the figure.

The educational toy may optionally include electronic features for lighting all or part of the globe, for rotating the globe, and/or for playing an audio message containing educational information regarding a geographical region displayed on the globe, or relating to the rotation of the earth, or other educational information.

Since most children generally engage in play with a doll, figurine, or other toy of some kind, children will feel comfortable handling the educational toy of the present invention frequently. The educational toy also helps children understand world geography, how the earth revolves on its axis, and day/night cycles.

These and other features of the present invention will become readily apparent upon consideration of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
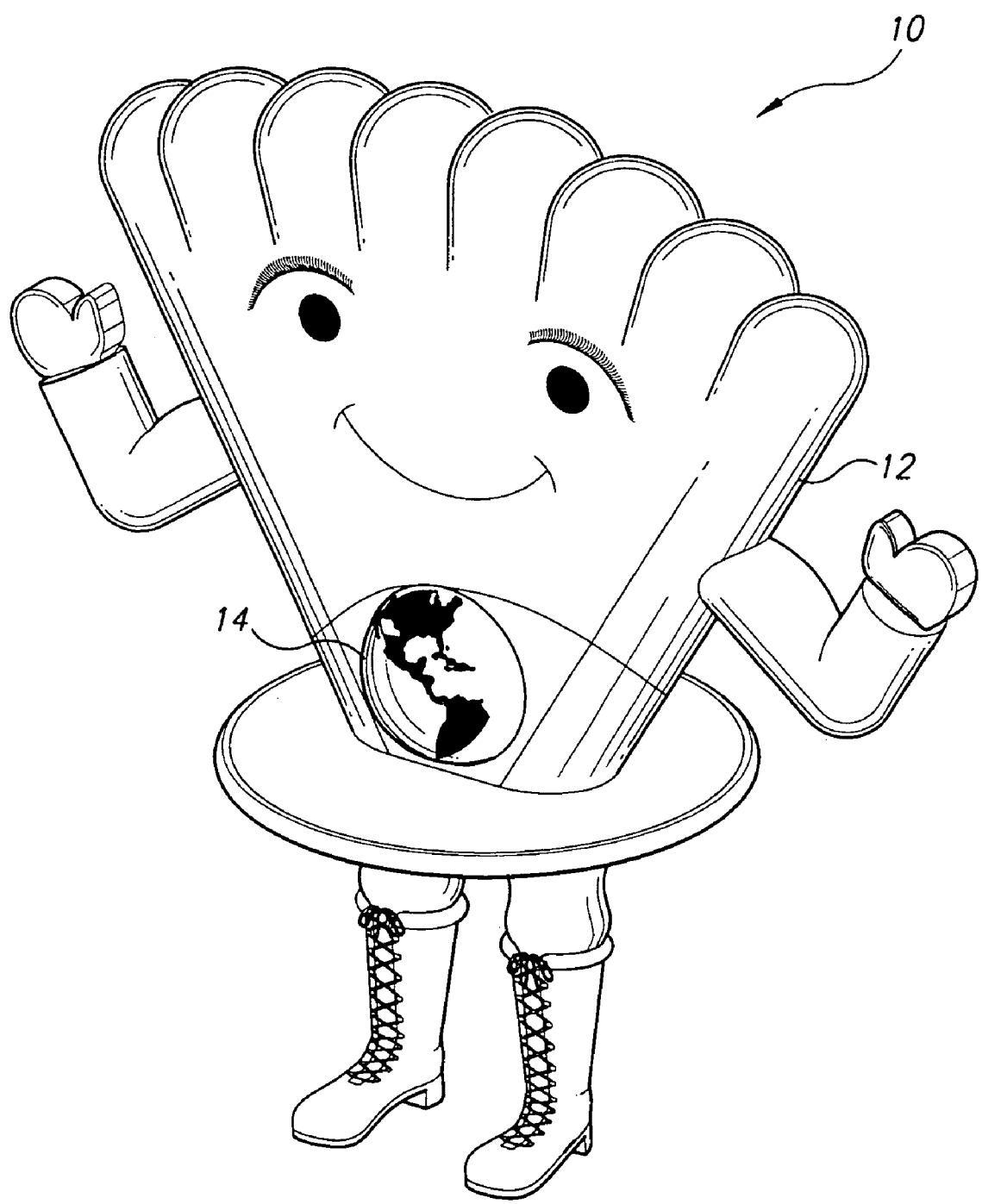
FIG. 1 is a perspective view of an educational toy according to the present invention.

The present invention relates to an educational toy, generally designated as 10 in the drawings. The educational toy includes a toy FIG. 12 and a globe 14 which is rotatable within the toy FIG. 12. Although a hemispheric portion of the globe 14 is viewable from a front side of the toy FIG. 12 in the drawings, the toy FIG. 12 may be configured to display a hemispheric portion of the globe 14 from both sides of the body of the toy FIG. 12. It will also be understood that the toy FIG. 12 is not limited to the scallop-shaped toy FIG. 12 depicted in the drawings and that the toy FIG. 12 can be of any suitable form or shape. As used in the present application, the term "toy figure" means a doll, figurine, stuffed animal, inflatable water toy, string or hand puppet, or any other toy having a body depicting a human, animal, alien, fantasy, or other character in which the body is capable of supporting a rotating globe. Thus, the toy FIG. 12 can include, for example, dolls, Santa Claus dolls, teddy bears, hand puppets, string puppets, inflatable rubber ducks typically used in the bathtub, angels, figurines of real, cartoon, or fairy tale characters, Christmas trees, hearts, squares or any other shape. The toy FIG. 12 can be made from plastic, fabric, or other suitable material.

The globe 14 includes a map or image of the earth on its exterior surface, including any or all of the indicia of a standard reproduction of the earth's surface. Thus, the map may include raised portions or contours to represent mountain ranges, as well as other topography. The globe 14 can be made from plastic, fabric, foam, or any other suitable material.

Figure 2A:
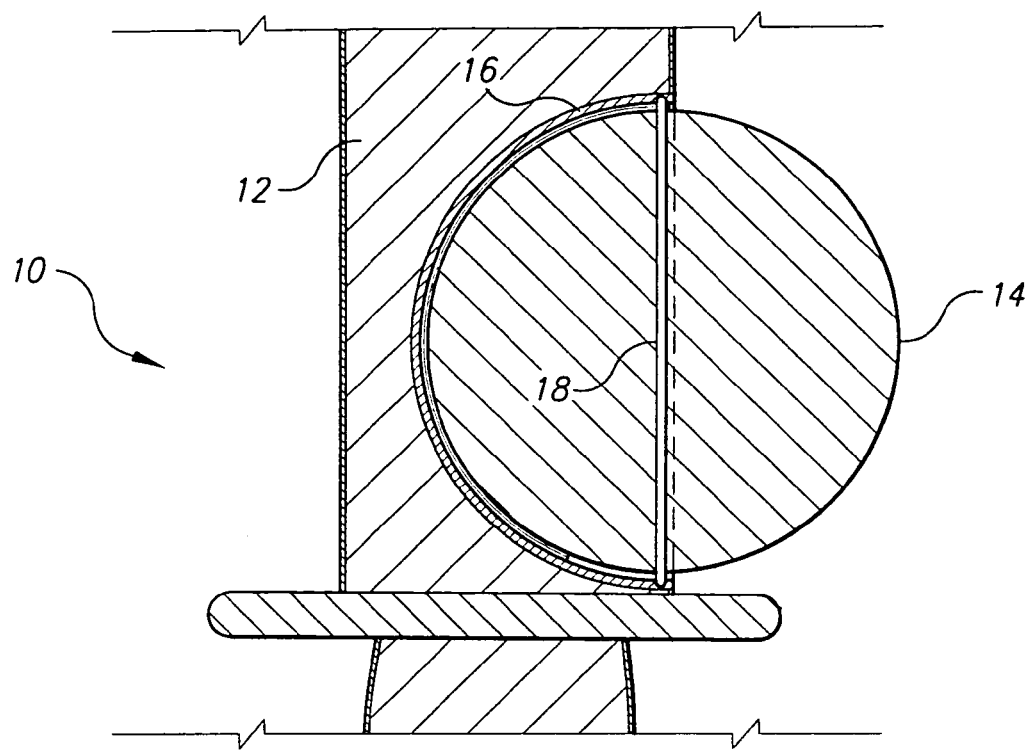
FIG. 2A is a fragmented section view of a portion of an educational toy according to the present invention, showing a first embodiment of a rotating globe.
Figure 2B:
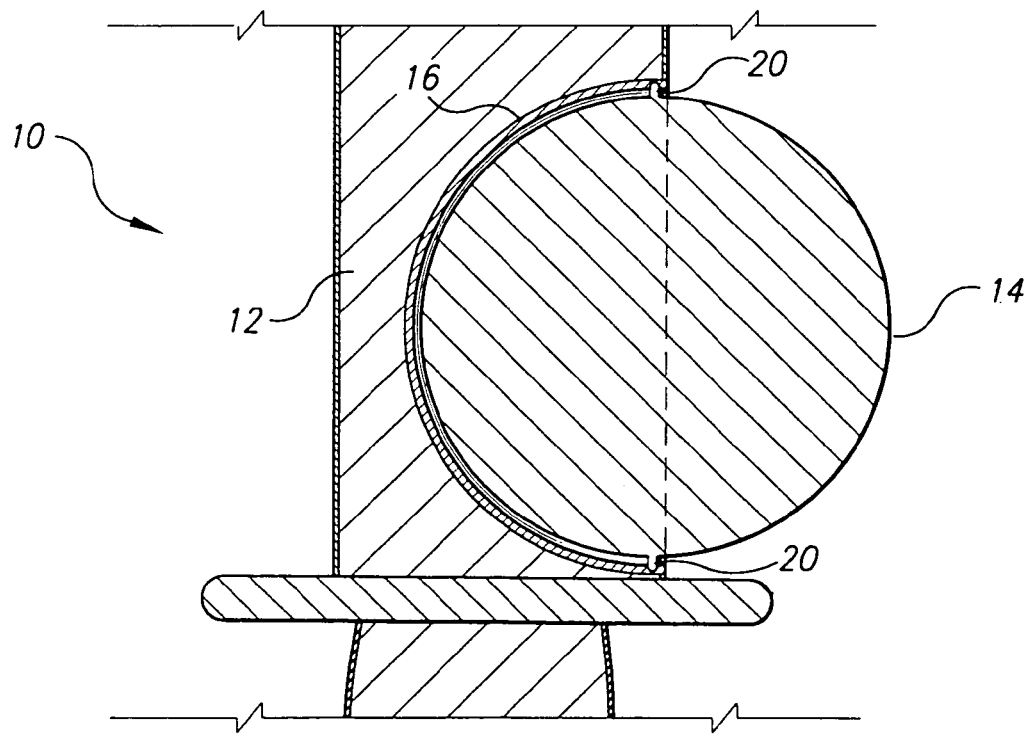
FIG. 2B is a fragmented section view of a portion of an educational toy according to the present invention, showing a second embodiment of a rotating globe.

FIGS. 2A and 2B depict exemplary sectional views of a portion of the toy FIG. 12 and the globe 14 positioned within the toy FIG. 12. As can be seen, a supportive frame 16 may be disposed within the toy FIG. 12 for receiving the globe 14. The frame 16 can be hemispherical, semicircular, arcuate, or of any other suitable shape or structure. The frame 16 can be made from any suitable material, including, but not limited to, metal or plastic.

The globe 14 and frame 16 may be disposed in any suitable portion of the figurine. The globe 14 can be positioned within the frame 16 in any conventional manner which would allow a user to manually rotate the globe 14 within the frame 16. As shown in FIG. 2A, for example, a rod 18 or other suitable cylindrical structure may extend through the globe 14 and attach at its opposing ends to the frame 16. The globe 14 may thereby revolve around the rod 18 when manually spun. The globe 14 may be equipped with bearings where the rod 18 enters and exits the globe to ensure smooth rotation of the globe around the rod 18.

In another embodiment, shown in FIG. 2B, pins 20 may be provided to connect the globe 14 to the frame 16. The pins 20 may be fixed to diametrically opposed positions of the globe 14 and configured to rotate in holes defined within the frame 16. Alternatively, the pins 20 may be fixed in the frame 16, but rotatably mounted to the globe 14.

Figure 3:
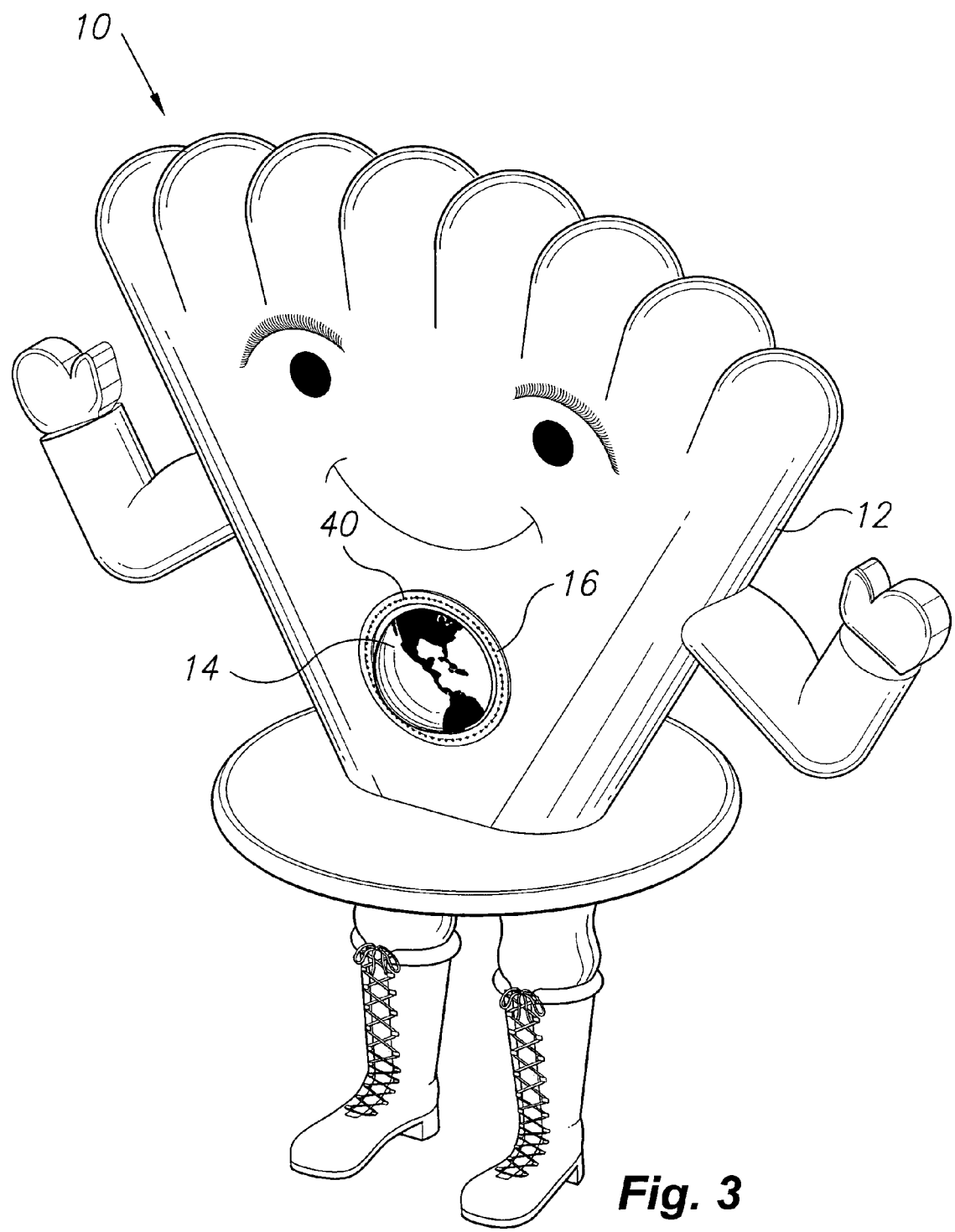
FIG. 3 is a perspective view of an educational toy according to the present invention showing a second embodiment of a supporting frame.

Turning now to FIG. 3, the globe 14 may be positioned within the toy FIG. 10 by first disposing the supportive frame 16 within the toy FIG. 10. The globe 14 is then positioned within the frame 16 in any conventional manner that would allow a user to manually rotate the globe 14 within the frame 16, for example, using a rod 18 extending through the globe 14 or pins 20 fixed to diametrically opposed positions of the globe 14 and configured to rotate in holes defined within the frame 16. The frame 16 may include attachment holes 40, which may be used to attach the frame 16 to the toy FIG. 12 when the toy FIG. 12 is made from a soft material such as cotton or the like. The attachment holes 40 allow the frame 16 to be sewn to the toy FIG. 12, thereby retaining the frame 16 and globe 14 within the body of the toy FIG. 12.

The globe 14 may be removed from the frame 16 and any other spherical object may be replaced within the frame 16. The globe 14 is therefore interchangeable with any spherical object.

Figure 4:
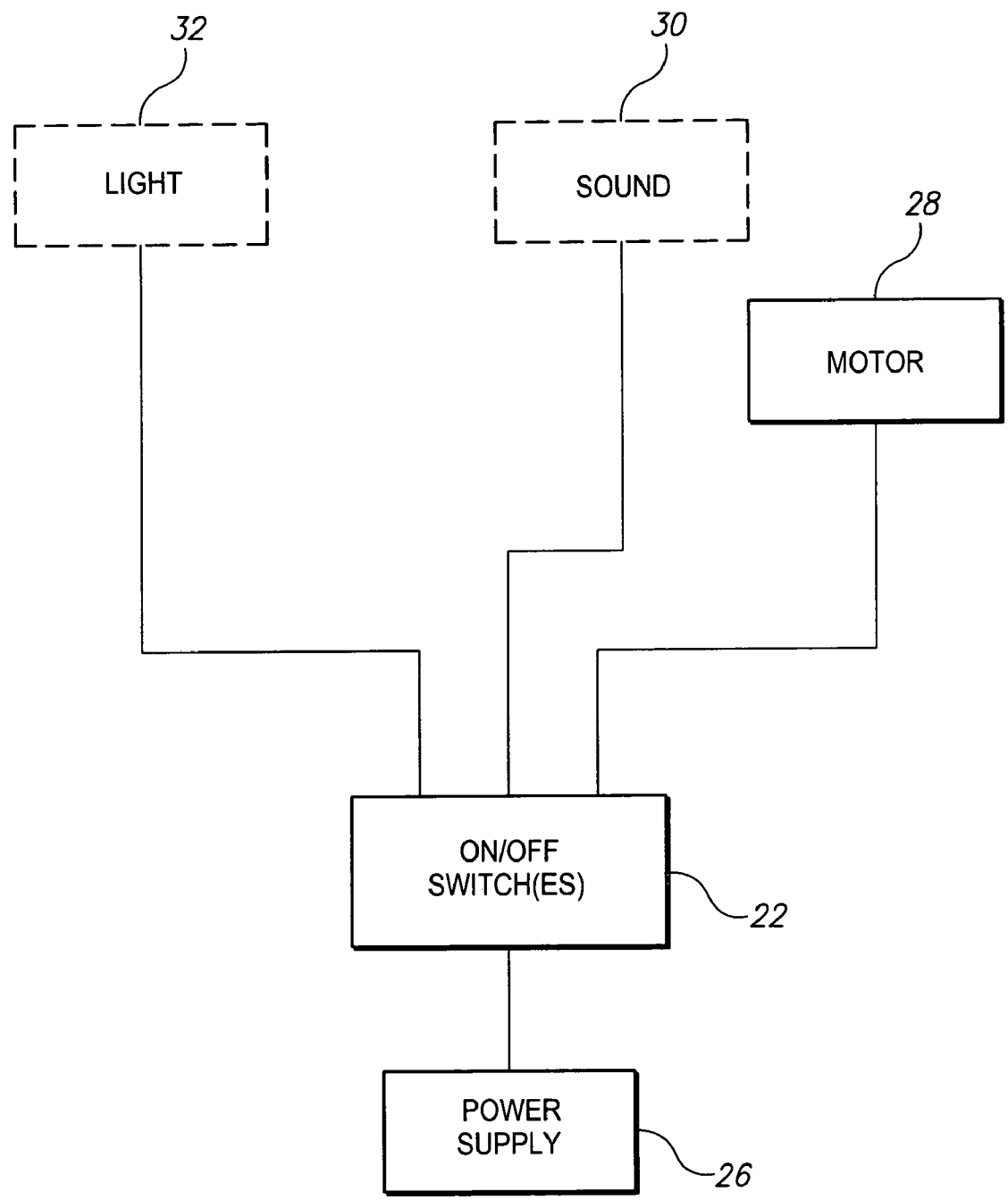
FIG. 4 is a block diagram of optional electronic circuitry for an educational toy according to the present invention for illuminating the globe, playing an audio message, or rotating the globe.

Optionally, the educational toy 10 may be configured to allow for automated rotation of the globe 14, illumination of the globe 14, and/or activation of an audio device. Automation of the educational toy 11 can be accomplished in any conventional manner known in the art. As shown in FIG. 4, the educational toy may be equipped with one or more switches 22, which may be located on the body of the toy FIG. 12, on the globe 14, or on the frame 16, that can be triggered to connect a power supply 26 to an appropriate electrical device or circuit. The power supply 26 can be, for example, one or more batteries, e.g., a watch battery, AA or AAA alkaline batteries, a lithium battery, etc. The power supply 26 may be a direct current from an electrical outlet or other source of current. The power supply 26 provides sufficient voltage and current to activate a motor 28, a sound device 30 and/or a light source 32. Alternatively, however, the educational toy 10 may be configured in any suitable manner known in the art which would allow the motor 28, the sound device 30, and/or the light source 32 to be activated when a user touches designated portions of the globe 14 or the toy FIG. 12, e.g., by capacitance switches, etc., as is well known in the electrical arts.

Activation of the motor 28 initiates rotation of the globe 14. Rotation of the globe 14 provides a child with a better understanding of how the earth revolves on its axis and the cycles of day and night. The motor may be a small piezoelectric motor, a stepper motor, or any other motor known in the art.

Activation of the light source 32 illuminates the globe 14. Illumination of the globe 14 allows a child to use the toy 10 at night, while traveling in a car, for example. The light source 32 may be an incandescent light, one or more light emitting diodes, a fluorescent light, or any other illumination source known in the electrical arts. For this purpose, the globe 14 may be made of translucent material and the light source may be disposed within, behind, above, or below the globe 14.

Activation of the sound device 30 triggers an audio message which identifies or describes the geographic location(s) which are displayed once the globe 14 has returned to a stationary position after spinning. The sound device 30 may be a magnetic tape or audio chip connected to a speaker. For example, if the globe 14 stops its rotation with the continent of Europe displayed, the audio may recite an appropriate informational message, such as: "This is Europe, an area with many countries. These countries are Spain, France, Germany . . . . "

Figure 5:
FIG. 5 is a perspective view of a second embodiment of the educational toy according to the present invention.

FIG. 5 shows another embodiment of the educational toy 100. In this embodiment, the toy FIG. 102 is shaped as an angel, but any figure may be used that has arms, legs or limbs. The globe 14 is situated on the outstretched hand 104 of the toy FIG. 102. A shaft 106 extends from the outstretched hand 104 and is adapted to receive the globe 14. The globe 14 may include an opening for receiving the shaft 106. The shaft 106 allows the globe 14 to be positioned and retained on the hand 104, and permits the globe 14 to be removable in order to substitute other spherical objects. The shaft 106 may be electrically connected to a motor 28, located either within the toy FIG. 102 or attached to the outside of the toy figure 102, that may initiate rotation of the shaft 106 such that when the globe 14 is positioned on the shaft 106, the globe 14 is rotated. The motor 28 may be omitted and a user may be able to manually rotate the globe 14 about the shaft 106. Although a shaft 106 is shown to retain the globe 14 and allow for the rotation of the globe 14, any other means for retaining and rotating the globe 14 on the hand 104 may be used.

Figure 6:
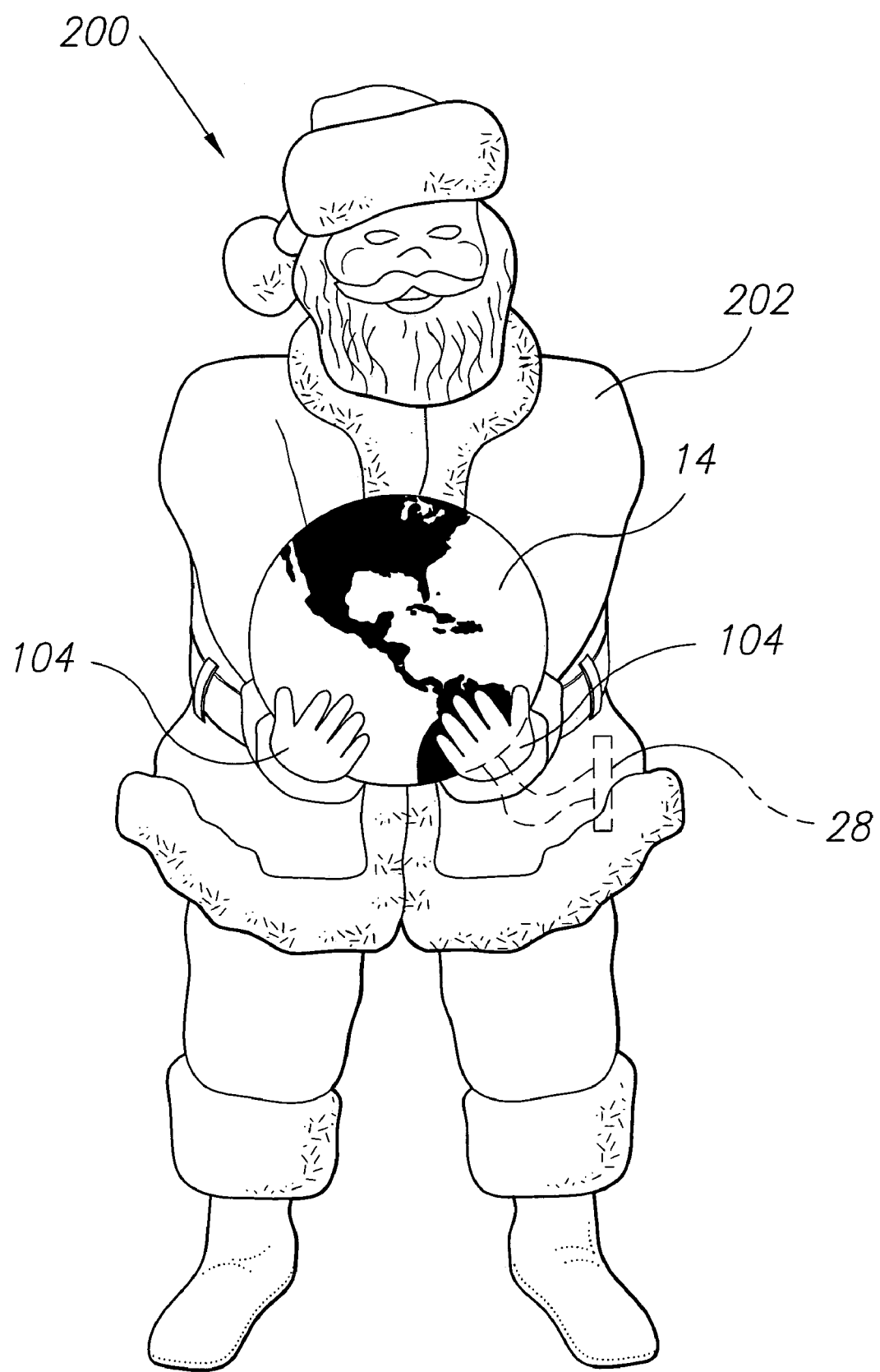
FIG. 6 is a perspective view of a third embodiment of the educational toy according to the present invention.

Turning now to FIG. 6, another embodiment of the educational toy 200 is shown. In this embodiment, the toy FIG. 202 is shaped as a Santa Claus, although any figure may be used that has arms, legs or limbs. The globe 14 may be situated on the outstretched hands 104 of the toy FIG. 202. Any method of rotating the globe 14 may be used, including use of a shaft 106 (shown more clearly in FIG. 5) connected to a hand 104 or any other similar manner of allowing the globe 14 to be rotated may be employed. A motor 28 may be electrically connected to the shaft 106 or other rotating device in order to revolve the globe 14. The motor 28 may be attached within the toy FIG. 202 or outside of the toy FIG. 202. The globe 14 may be removed from the hands 104 of the FIG. 202 and replaced with any other spherical object. Although a shaft 106 is shown to retain the globe 14 and allow for the rotation of the globe 14, any other means for retaining and rotating the globe 14 on the hand 104 may be used, for example, providing ball bearings in either hand 104 and situating the globe 14 on the ball bearings such that the globe 14 may be rotated.

While a rotating globe 14 is shown in the drawings, any spherical object may be used in place of the globe 14, for example a snow globe.

Hence the educational toy 10 provides an amusing diversion for children that also provides education regarding geography and the structure of the earth.

It is to be understood that the present invention is not limited to the embodiments described above, but encompasses any and all embodiments within the scope of the following claims.

I claim:

1. An educational toy, comprising:

a toy figure having a body;

a globe-supporting frame disposed within the body, the globe supporting frame being removable from the body of the toy figure, wherein the frame includes a plurality of attachment holes affixed to the frame and adapted to attach to the body of the toy figure; and a globe depicting the earth rotatably and removably mounted within the frame, at least a portion of the globe being visible outside the body, whereby the educational toy is adapted for teaching children about geography of the earth.

2. An educational toy, comprising:

a toy figure having a body;

a supporting frame disposed within the body, the supporting frame being removable from the body of the toy figure; and an object rotatably and removably mounted within the frame, at least a portion of the object being visible outside the body.

3. The educational toy of claim 2, wherein the frame includes a plurality of attachment holes affixed to the frame and adapted to attach to the body of the toy figure.

* * * * *